No. 897,829. PATENTED SEPT. 1, 1908.
H. N. HARPER.
FERTILIZER DISTRIBUTER.
APPLICATION FILED JUNE 3, 1908.
2 SHEETS—SHEET 1
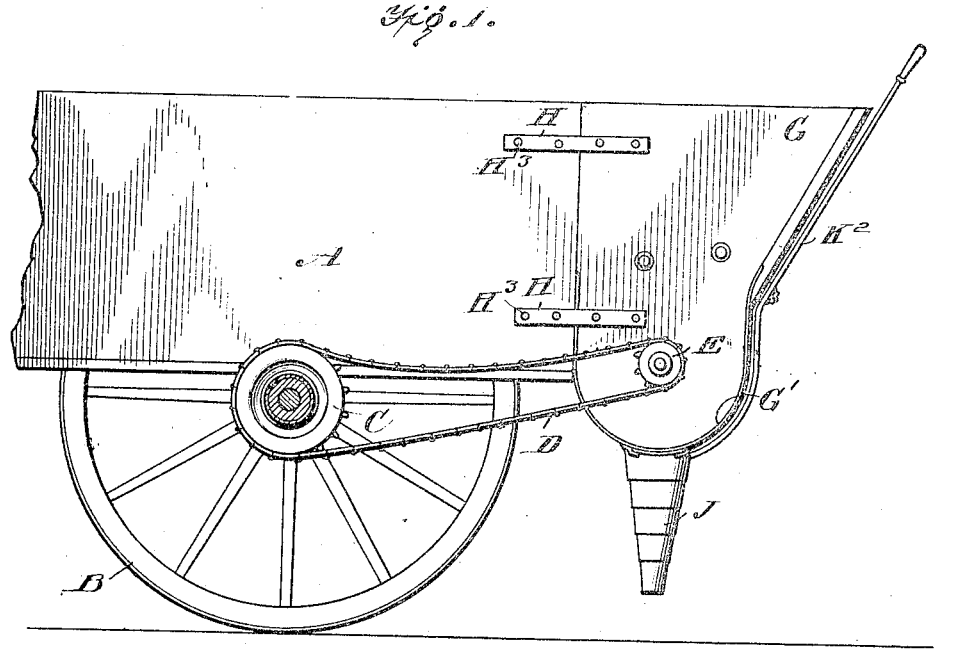
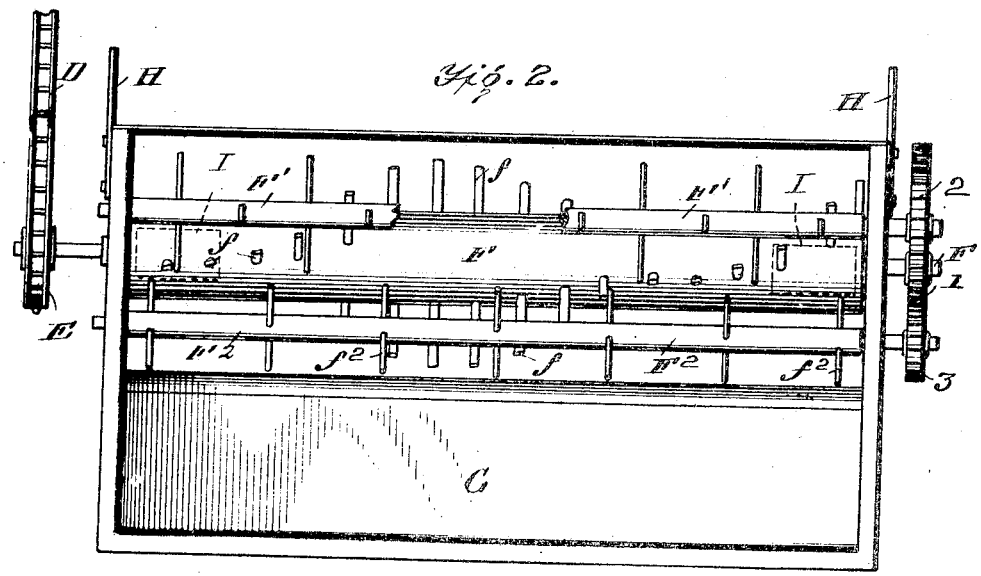
WITNESSES
INVENTOR
HENRY N. HARPER,
BY
ATTORNEYS

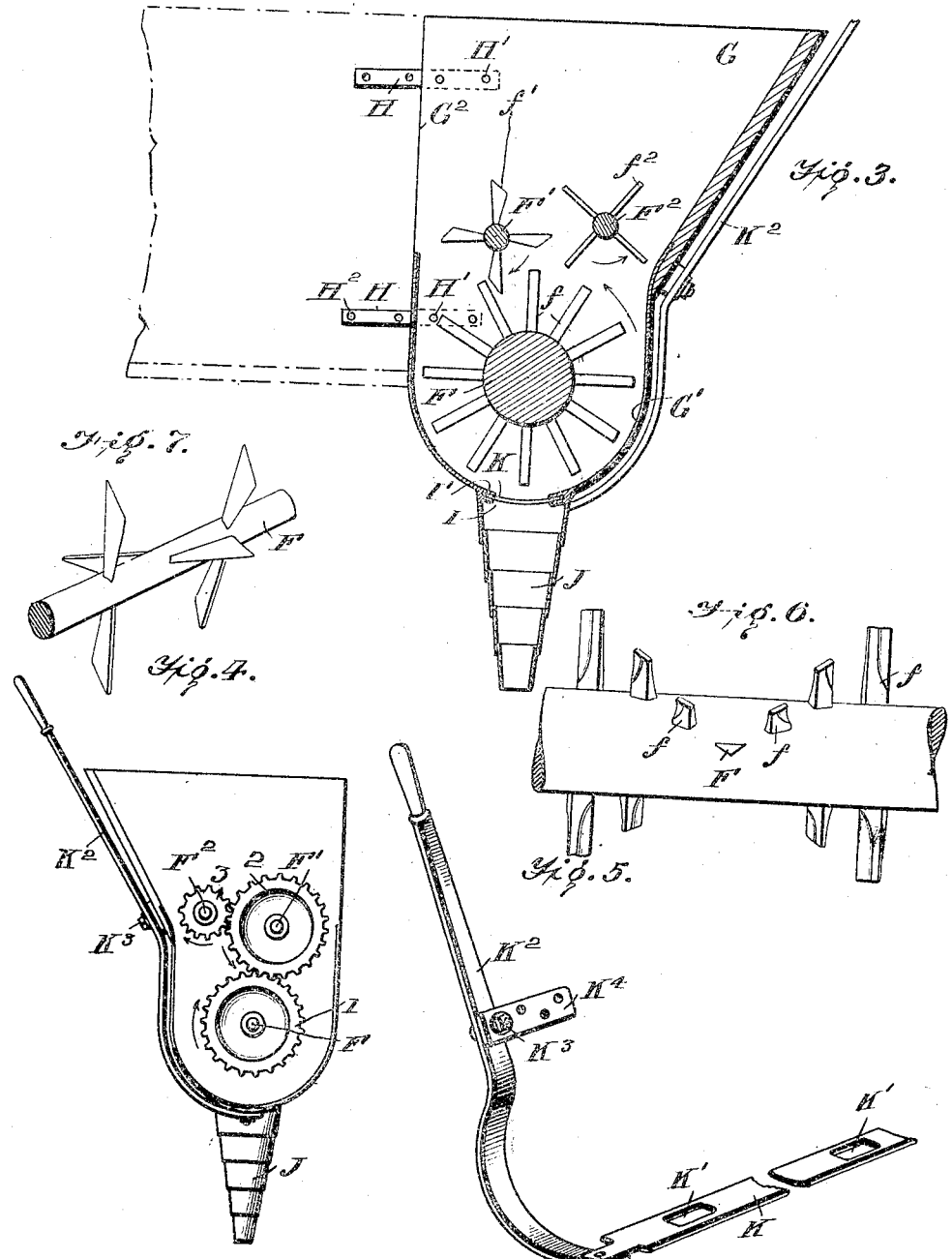

UNITED STATES PATENT OFFICE.

HENRY N. HARPER, OF MONROE, LOUISIANA.

FERTILIZER-DISTRIBUTER.

No. 897,829.  Specification of Letters Patent.  Patented Sept. 1, 1908.

Application filed June 3, 1908. Serial No. 436,375.

*To all whom it may concern:*

Be it known that I, HENRY N. HARPER, a citizen of the United States, and a resident of Monroe, in the parish of Ouachita and State of Louisiana, have made certain new and useful Improvements in Fertilizer-Distributers, of which the following is a specification.

This invention is an improvement in fertilizer distributers and particularly in that class of such devices adapted to be applied to the rear part of a farm wagon box and to be attached and detached without change in the construction of the box; and the invention consists in certain novel constructions and combinations of parts as will be hereinafter described and claimed.

In the drawings—Figure 1 is a side view of my invention as in use. Fig. 2 is a top plan view thereof, parts being broken away. Fig. 3 is a vertical longitudinal section of the fertilizer distributer, a portion of the wagon box being indicated in dotted lines. Fig. 4 is a side view of the opposite end of the fertilizer distributer from that shown in Fig. 1. Fig. 5 is a detail view of the regulating lever and the slide connected therewith. Fig. 6 is a detail side elevation of the central portion of the main shaft, and Fig. 7 is a detail view of a portion of the intermediate shaft showing the construction of knives thereon.

As best shown in Fig. 1 the wagon body A and the wheel B may be of ordinary construction and upon or connected with the hub of the wheel B I provide a drive sprocket wheel C receiving a sprocket chain D, which connects with a sprocket wheel E on the end of the main shaft F. The fertilizer distributer includes a box G having a rounding bottom G', which terminates at the front side of the box about midway between the top and bottom of the box, leaving the upper portion of the front side of the box open at G², as best shown in Fig. 3 to facilitate the shoveling of fertilizer, especially barn yard fertilizer into a box G from the wagon body A in the use of the invention.

In practice the box G of the fertilizer distributer is secured to the rear end of the wagon box A, by means of straps H, being suitable bars of metal secured at their rear ends H', to the ends of the fertilizer distributer box and extending thence forward and perforated at H² for the reception of bolts H³ connecting the said bars H with the side-boards of the wagon box when the fertilizer distributer is applied thereto. This construction permits the fertilizer distributer to be attached to the rear part of the farm wagon box and be removed and reapplied whenever desired without any change in the structure of the wagon box and it may be applied and removed with the end gate either in place or removed, the attaching devices being entirely independent of the end gate as will be understood from the drawings and foregoing description.

The fertilizer is discharged through openings I in the bottom G' of the box to spouts J, and a valve slide K is movable in guides I' longitudinally of the bottom of the box and has openings K' which may be movable into and out of full or partial registry with the openings I, the said openings I being preferably near the opposite ends of the box G as indicated in dotted lines Fig 2. The slide K is operated by a lever K² pivoted at K³ to an arm K⁴ projecting from the box G and adapted for operation to control the discharge from the openings I as will be understood from the drawings.

In preparing the fertilizer and in bringing it to the discharge openings I, I employ what for convenience of reference I term the main shaft F, the intermediate shaft F' and the stripper shaft F², and the shaft F has a gear 1 meshing with a gear 2 on the shaft F' and the gear 2 is meshed with a gear 3 on the shaft F², the gears 1 and 2 being approximately equal in size and the gear 3 is about one-half the size of the gear 2, whereby the shaft F² will be driven at twice the speed of the shafts F and F', its purpose being to pick up straw, shucks, etc., from the pins on the shaft F and to throw them on to the knives of the intermediate shaft F' more fully described hereinafter.

The shaft F has a comparatively large drum from which project beveled blades *f*, which are inclined as best shown in Fig. 6 in reverse directions from the center toward the opposite ends in such manner as to feed the fertilizer toward the openings I near the ends of the fertilizer box.

The intermediate shaft F' is a cutter shaft and is provided with edged blades *f'*, which project radially and operate to cut up straw, shucks, cobs and the like, and will be found especially useful in preparing barn yard fertilizer for distribution, disintegrating such material in such manner as to prevent clogging in the use of the invention.

The shaft F² is provided with radial pins $f^2$, which operate to pick up straw, shucks and the like from the blades on the main shaft and to throw the same on to the knives of the shaft F'. It will be noticed that the blades $f$ and the knives $f''$ overlap as they revolve, thus aiding in the cutting operation of the knives F' as best shown in Fig. 3 of the drawings.

I claim—

1. The improvement in fertilizer distributers herein described, comprising the fertilizer box having a rounded bottom provided near its ends with discharge openings and having its front plate terminating at approximately the bottom of the wagon box, whereby the upper portion of the box is open at its front side, bars projecting forwardly from the fertilizer box and adapted to be secured to the side boards of a wagon box, a main shaft journaled in the fertilizer box and provided with blades which are beveled or inclined in reverse directions from its center toward the ends of the shaft, whereby to feed the material in such directions, a cutter shaft geared with the main shaft and having projecting knives adapted to cut up straw, shucks, cobs and the like and a driven stripper shaft journaled in the fertilizer box and having therein projecting pins adapted to pick straw, shucks and the like from the blades of the main shaft and to throw the same on the knives of the cutter shaft, and a regulating slide movable relatively to the fertilizer box and having openings which may be set into and out of registry with the discharge openings thereof, and a lever for operating the said slide, substantially as set forth.

2. The combination in a fertilizer distributer substantially as described, of the box, a main shaft operating therein and having conveyer blades inclining in reverse directions from the center of the shaft towards its ends and adapted to feed the material toward the opposite ends of the fertilizer box, a cutter shaft journaled in the box above the main shaft and having projecting knives adapted to cut straw and the like and to prepare the same for distribution, and a stripper shaft having pins adapted to pick straw, shucks and the like from the blades of the main shaft and to throw same to the knives of the cutter shaft, substantially as set forth.

3. The combination in a fertilizer distributer with the box and a bladed main shaft therein of a cutter shaft above the main shaft and slightly to one side of the center thereof and having knives adapted to cut up barn yard fertilizer material in the passage thereof to the main shaft, and a stripper shaft above the main shaft and to the opposite side of the center thereof from the cutter shaft and having pins adapted to pick straw, shucks and the like from the blades of the main shaft and to deliver the same to the knives of the cutter shaft, substantially as set forth.

HENRY N. HARPER.

Witnesses:
ROBERT O. RANDLE,
C. S. DUNN.